United States Patent
Kang

(10) Patent No.: US 9,526,053 B2
(45) Date of Patent: Dec. 20, 2016

(54) APPARATUS AND METHOD FOR USING MEMORY DEVICE

(71) Applicant: Samsung Electronics Co., Ltd., Gyeonggi-do (KR)

(72) Inventor: In-Shik Kang, Gyeonnggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 58 days.

(21) Appl. No.: 14/301,625

(22) Filed: Jun. 11, 2014

(65) Prior Publication Data

US 2015/0043529 A1 Feb. 12, 2015

(30) Foreign Application Priority Data

Aug. 9, 2013 (KR) .................. 10-2013-0094682

(51) Int. Cl.
*H04W 36/14* (2009.01)
*H04W 36/36* (2009.01)
*H04W 36/24* (2009.01)

(52) U.S. Cl.
CPC ............. *H04W 36/14* (2013.01); *H04W 36/36* (2013.01); *H04W 36/245* (2013.01)

(58) Field of Classification Search
None
See application file for complete search history.

(56) References Cited

U.S. PATENT DOCUMENTS

| 2007/0014261 A1* | 1/2007 | Lee | ........................ | H04W 36/32 370/331 |
|---|---|---|---|---|
| 2008/0181205 A1 | 7/2008 | Azada et al. | | |
| 2010/0190499 A1* | 7/2010 | Wu | .................... | H04W 36/0066 455/436 |
| 2012/0176892 A1* | 7/2012 | Yamamoto | ............ | H04W 36/30 370/221 |

FOREIGN PATENT DOCUMENTS

| EP | 1 744 581 A1 | 1/2007 |
| EP | 1 816 794 A2 | 8/2007 |
| WO | 2005/125232 A2 | 12/2005 |

* cited by examiner

Primary Examiner — Yemane Mesfin
Assistant Examiner — Jeff Banthrongsack
(74) Attorney, Agent, or Firm — Cha & Reiter, LLC

(57) ABSTRACT

An apparatus and a method for providing a packet service (PS) or a Circtui service (CS) in an electronic device. The apparatus determines a number of "ping-pongs" in which an access change between a first modem and a second modem is repeatedly made for a predetermined first time, compares the number of ping-pongs with a predetermined reference number of ping-pongs, and provides the PS through the second modem for a predetermined second time when the determined number of ping-pongs is equal to or greater than the predetermined reference number of ping-pongs.

20 Claims, 7 Drawing Sheets

APPARATUS AND METHOD FOR USING MEMORY DEVICE

CLAIM OF PRIORITY

This application claims priority under 35 U.S.C. §119(a) to Korean Application Serial No. 10-2013-0094682, which was filed in the Korean Intellectual Property Office on Aug. 9, 2013 the entire content of which is hereby incorporated by reference in its entirety.

BACKGROUND

1. Technical Field

The present disclosure relates to an electronic device that wireless communicates with other devices. More particularly, the present disclosure relates to an apparatus and a method for providing a packet service in an electronic device.

2. Description of the Related Art

Electronic devices including but not limited to a smart phone and a tablet Personal Computer (PC) can provide a multi-Radio Access Technology (hereinafter, referred to as "RAT"). The term "multi-RAT" refers to a technology supporting a plurality of RATs, for example, a technology supporting RATs which can access a Global System for Mobile telecommunication (hereinafter referred to as "GSM") corresponding to a second generation mobile communication system used in Europe, a Universal Mobile Telecommunication System (hereinafter referred to as "UMTS") corresponding to a third generation mobile communication system, and a Long Term Evolution (hereinafter referred to as "LTE") system corresponding to a fourth generation mobile communication system.

In some examples, the electronic device may support the multi-RAT technology and perform a Packet Service (hereafter referred to as a "PS") and a Circuit Service (hereinafter referred to as a "CS") through one RAT of the multi-RAT. However, there are instances where the one RAT may be unable to provide the appropriate PS or CS.

For example, when a first cell area supporting a first RAT becomes in a no-service state or a service-unavailable state due to various reasons, such as a weak electric field, the electronic device may not provide the PS through the first RAT, but may instead provide the PS through a second RAT. Further, the electronic device may periodically search for a particular cell area supporting the first RAT. As a result of the search, when the particular cell area is detected for a predetermined time or longer, the electronic device 101 may provide the PS through the first RAT. However, when the particular cell area is in the service-unavailable state, the electronic device cannot provide the PS through the first RAT, but can provide the PS through the second RAT again. An operation such as the aforementioned including a trial of an access to the first RAT from the second RAT in order to provide the PS and then returning to an access to the second RAT from the first RAT due to failure in the access to the first RAT is called "a ping-pong".

When the ping-pong is repeatedly generated, the electronic device cannot provide a stable PS to the user and increases power consumption.

SUMMARY

Accordingly, various embodiments of the present disclosure provide an apparatus and a method for providing a stable Packet Service (PS) by reducing the number of ping-pongs of the electronic device between different Radio Access Technologies.

Further, various embodiments of the present disclosure may provide an apparatus and a method for providing a PS which can reduce the number of ping-pongs of the electronic device to reduce power consumption due to the ping-ponging.

In accordance with an aspect of the present disclosure, an electronic device is provided. The electronic device includes: a first modem that supports a first Radio Access Technology (RAT); a second modem that supports a second RAT; an determining module that is configured to determine a number of ping-pongs in which an access change between the first modem and the second modem of the electronic device is repeatedly made for a predetermined first time; a comparing module that compares the number of ping-pongs determined by the determining module with a predetermined reference number of ping-pongs; and a providing module that provides a Packet Service (PS) through the second modem for a predetermined second time when the number of ping-pongs determined by the determining module is equal to or larger (i.e. greater) than the predetermined reference number of ping-pongs.

In accordance with another aspect of the present disclosure, a method of providing a PS in an electronic device is provided. The method includes: determining a number of ping-pongs in which an access change between a first modem supporting a first RAT and a second modem supporting a second RAT of an electronic device is repeatedly made for a predetermined first time period; comparing the number of ping-pongs determined with a predetermined reference number of ping-pongs; and providing the PS through the second modem for a predetermined second time period when the number of ping-pongs determined is equal to or greater than the reference number of ping-pongs.

Various embodiments of the present disclosure may provide an apparatus and a method for providing a PS in the electronic device, so as to reduce the number of ping-pongs and thus provide a stable PS.

Further, various embodiments of the present disclosure may provide an apparatus and a method for providing the PS in the electronic device, so as to reduce the number of ping-pongs and thus reduce power consumption due to the ping-pong.

BRIEF DESCRIPTION OF THE DRAWINGS

The above and other aspects, features, and advantages of the present disclosure will be more apparent to a person of ordinary skill in the art from the following detailed description taken in conjunction with the accompanying drawings, in which.

DETAILED DESCRIPTION

Hereinafter embodiments of the present disclosure will be described in detail with reference to the accompanying drawings. Further, a detailed description of known functions and configurations which may obscure appreciation of the subject matter of the present disclosure with a discussion of such known functions and configurations unclear will be omitted.

The electronic device according to an exemplary embodiment of the present disclosure refers to a portable electronic device that should be interpreted broadly, and may be any of a video phone, a mobile phone, a smart phone, an IMT-2000 (International Mobile Telecommunication 2000) terminal, a WCDMA terminal, a UMTS (Universal Mobile Telecommunication Service) terminal, a PDA (Personal Digital Assistant), a PMP (Portable Multimedia Player), a DMB (Digital Multimedia Broadcasting) terminal, an E-Book, a portable computer (for example, a notebook computer or a tablet computer), or a digital camera, just to name some non-limiting possibilities.

Figure 1:
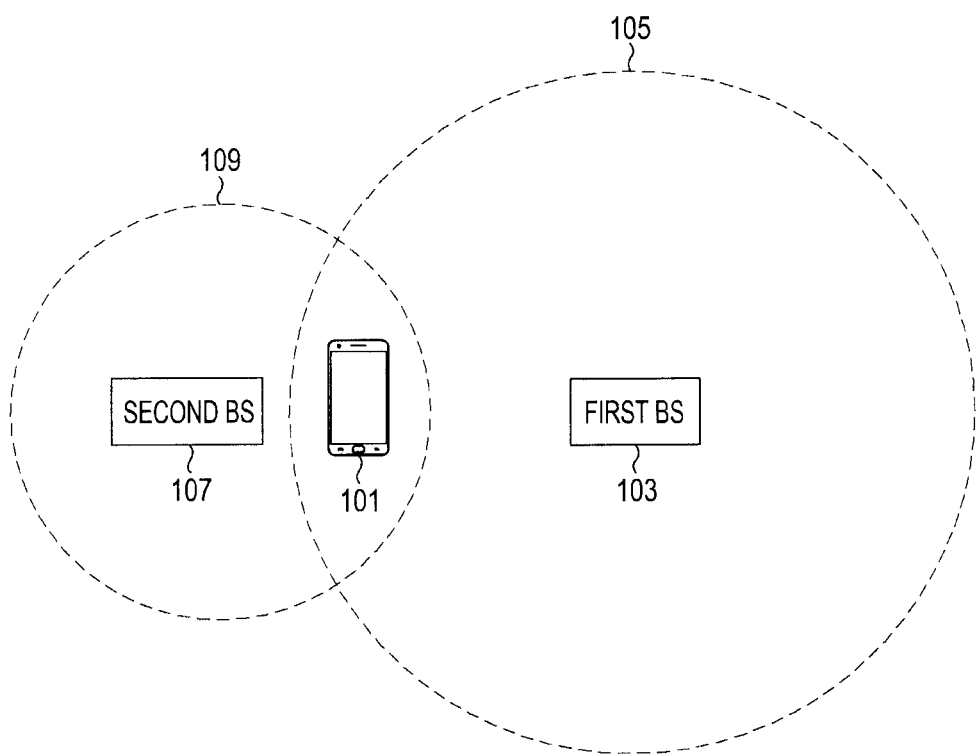
FIG. 1 illustrates a configuration of a wireless communication system according to an embodiment of the present disclosure.

FIG. 1 illustrates a configuration of a wireless communication system according to a first embodiment of the present disclosure.

Referring now to FIG. 1, the wireless communication system may include an electronic device 101, a first Base Station (BS) 103, and a second BS 107.

More specifically, the first BS 103 has a first cell area 105 and the second BS 107 has a second cell area 109. The first BS 103 and the second BS 107 support different Radio Access Technologies (hereinafter referred to as "RATs"), and may communication with the electronic device 101 through a radio link.

For a non-limiting example, the first BS 103 may support Long Term Evolution (hereinafter referred to as "LTE") corresponding to one of the RATs, and the second BS 107 may support Global System for Mobile communication (hereinafter referred to as "GSM") corresponding to one of the RATs. Alternatively, the first BS 103 may support LTE, and the second BS 107 may support a Universal Mobile Telecommunication System (hereinafter referred to as "UMTS") corresponding to one of the RATs. In other words, there are number of different Radio Access Technologies that can be provided in different combinations.

Each of the first BS 103 and the second BS 107 may periodically transmit its own BS-related information to the electronic device 101. The BS-related information includes a cell IDentifier (ID) of the corresponding BS, and the cell ID refers to an inherent identifier allocated to distinguish between cells. For example, the first BS 103 may transmit BS-related information including a first cell ID corresponding to the first cell area 105 to the electronic device 101. Alternatively, the second BS 107 may transmit BS-related information including a second cell ID corresponding to the second cell area 109 to the electronic device 101.

The electronic device 101 may support a number of multi-RAT protocols and can perform a Packet Service (hereafter referred to as a "PS") and a Circuit Service (hereinafter referred to as a "CS") through one RAT of the multi-RAT. For example, when the electronic device 101 supports a multi-RAT including LTE and GSM, the electronic device 101 may provide the PS through LTE and provide the CS through GSM.

In some non-limiting examples provided herein, when the state of the first cell area 105 supporting a first RAT (for example, LTE) is a no-service state or a service-unavailable state, the electronic device 101 may provide the PS through a second RAT (for example, GSM) without provision of the PS through the first RAT (for example, LTE). Further, the electronic device 101 may periodically search for a particular cell area supporting the first RAT. As a result of the search, when the particular cell area is found, the electronic device 101 may provide the PS through the first RAT. However, when the particular cell area is in the service-unavailable state, the electronic device 101 may provide the PS through the second RAT without the provision of the PS through the first RAT. Such an operation including a trial of an access to the first RAT from the second RAT in order to provide the PS and then an access to the second RAT from the first RAT due to failure in the trial, as previously disclosed herein, is called a ping-pong.

When the ping-pong is repeatedly generated, the electronic device 101 cannot stably provide the PS to the user, and power consumption of the electronic device 101 is likely to increase.

In order to reduce the repeatedly generated ping-pongs, the electronic device 101 determines whether the identified number of ping-pongs over a certain predetermined time is equal to or greater than a predetermined reference number of ping-pongs for a predetermined first time. When the number of ping-pongs identified is equal to or greater than the reference number of ping-pongs, the electronic device 101 may provide the PS through a second modem 215 supporting the second RAT for a predetermined second time.

Figure 2A:
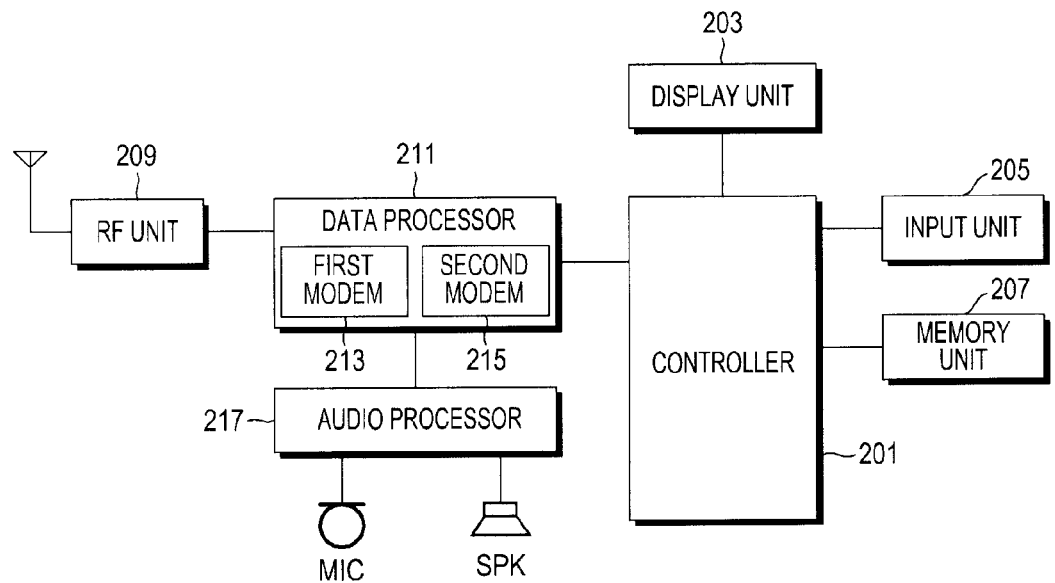
FIG. 2A and FIG. 2B are respective block diagrams of an electronic device and its service unit according to an embodiment of the present disclosure.
Figure 2B:
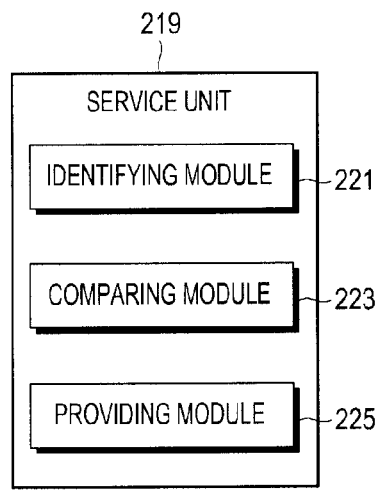

FIGS. 2A and 2B are block diagrams of the electronic device according to an embodiment of the present disclosure.

Referring now to FIGS. 2A and 2B, the electronic device 101 may include a controller 201, a display unit 203, an input unit 205, a memory unit 207, a Radio Frequency (RF) unit 209, a data processor 211, and an audio processor 217. It to be understood that under a broadest reasonable interpretation, the apparatus according to the present disclosure comprises statutory subject matter under 35 U.S.C. §101 and is not pure software.

Hereinafter each of the above components will be described. The RF unit 209 includes hardware configured for operation such as a transmitter, receiver, transceiver, and includes one or more antennas to perform a wireless communication function of the electronic device 101. More specifically, the RF unit 209 includes hardware such as a wireless transmitter for up-converting and amplifying a frequency of a transmitted signal and a wireless receiver for low noise-amplifying a received signal and down-converting a frequency. Further, the data processor 211, which includes hardware circuitry that may comprise integrated circuits, may include a transmitter for coding and modulating a transmitted signal and a receiver for demodulating and decoding a received signal. The data processor 211 may include a first modem 213, a second modem 215, and a codec, and the codec may include a data codec for processing packet data and an audio codec for processing an audio signal such as a voice. The first modem 213 may be a modem with circuitry configured for supporting the first RAT, for example, LTE, and the second modem 215 may be a modem with circuitry configured for supporting the second RAT, for example, GSM.

The audio processor 217, which also comprises circuitry such as a microprocessor or processor, is configured to perform a function of reproducing a received audio signal output from the data processor 211 through a speaker or transmitting a transmitted audio signal generated from a microphone to the data processor 211. The input unit 205 is comprised of hardware and includes keys for inputting number and character information and function keys for setting various functions, and the display unit 203 comprises hardware configured to display an image signal on a screen and displays data requested to be output by the controller 201.

For example, when the display unit 203 is implemented in a capacitive touch display screen type or a resistive touch display screen type, the input unit 205 may include only a minimum of predetermined keys and the display unit 203 may replace a part of key input functions of the input unit 205.

The memory 207 comprises a non-transitory memory and may include a program memory of machine executable code and a data memory. The program memory stores a booting system for the electronic device and an Operating System (hereinafter referred to as an "OS") for controlling a general operation of the electronic device 101, and the data memory stores various data generated during the operation of the electronic device 101.

The controller 201, which comprises hardware circuitry configured for operation such as a processor or microprocessor may perform a function of controlling the general operation of the electronic device 101. The controller 201 may include a service unit 219 for controlling the PS, and the service unit 219 comprises hardware circuitry configured for operation such as a processor or microprocessor and includes a determining module 221, a comparing module 223, and a providing module 225. The controller 201 may reduce the number of ping-pongs by operating the determining module 221, the comparing module 223, and the providing module 225, which are all statutory parts of the service unit 219 configured for operation. Each of the determining module 221, the comparing module 223, and the providing module 225 may be the programming module. And, the programming module may be implemented by software that configures hardware, firmware that configures hardware, hardware, or a combination of two or more thereof.

More specifically, in a third embodiment, the determining module 221 is configured to determine the number of ping-pongs occurring during a predetermined first time period and transmits the determined number of ping-pongs to the comparing module 223. The first time period is determined in advance, and refers to a time for which it is determined whether the number of ping-pongs determined between the first RAT and the second RAT of the electronic device is equal to or greater than a predetermined reference number of ping-pongs. The ping-pong between the first RAT and the second RAT refers to an operation including a trial operation of an access to the first RAT from the second RAT in order to provide the PS and then an access to the second RAT from the first RAT due to failure of the access to the first RAT.

The comparing module 223 comprises hardware circuitry configured to compare the number of ping-pongs received from the determining module 221 with the predetermined reference number of ping-pongs and transmits a result of the comparison operation to the controller 225. The reference number of ping-pongs is determined in advance through an experiment, and refers to the number of ping-pongs which makes the PS unstable and increases power consumption.

When the number of ping-pongs counted is equal to or greater than the reference number of ping-pongs through an analysis of the received result of the comparison, the providing module 225 may provide the PS through the second modem 215 supporting the second RAT for a predetermined second time. The second time is determined in advance, and refers to a time for which the PS is provided through the second RAT if a particular condition exists which prevents the generation of the ping-pong is not satisfied. The particular condition refers to a condition in which the PS is attempted through the first RAT even though the second time does not lapse, and may include at least one of an electric intensity of a first communication network supporting the first RAT equal to or greater than a reference electric intensity, a change in a cell ID, and signal quality of the first communication network equal to or higher than reference signal quality.

In a first embodiment, the comparing module 223 is configured to set a timer (not shown) to the predetermined first time, and operates the timer set to the first time. The first time is determined in advance, and for example, can activate a timer via a change in state. In addition, the "first time" refers to a time for which it is determined whether the number of ping-pongs between the first RAT and the second RAT is equal to or greater than a predetermined reference number of ping-pongs. The ping-pong between the first RAT and the second RAT refers to an operation including a trial operation of an access to the first RAT from the second RAT in order to provide the PS and then an access to the second RAT from the first RAT due to failure of the trial access to the first RAT. For example, the ping-pong between the first RAT and the second RAT of the electronic device refers to an operation including a movement of the PS access route from the second modem 215 (FIG. 2A) supporting the second RAT to the first modem 213 (FIG. 2A) supporting the first RAT and another movement of the PS access route from the from the first modem 213 to the second modem 215 due to failure in the PS access through the first modem 213. For example, the first RAT may be LTE, and the second RAT may be GSM.

The providing module may be set to provide the PS through the first modem when a quality of a signal received from a second BS supporting the first RAT for the second time is equal to or higher than a predetermined reference quality.

The determining module 221, which is a microprocessor or microprocessor configured for operation may determine the number of ping-pongs between the first RAT and the second RAT generated for the first time. While the PS is provided which is using the second modem 215 supporting the Second RAT, the service unit 219 tries the PS provision using the first modem 213 supporting the first RAT. If the above trial is failed, the service unit 219 tries the PS provision using the second modem 215. In that case, the determining module 221 may be configured to determine the number of the ping pongs as being one ping pong.

If the ping-pong is generated again for the first time, the determining module 221 may determine the number of ping-pongs as being two.

The comparing module 223 may compare the determined number of ping-pongs with the predetermined reference number of ping-pongs. The reference number of ping-pongs is determined in advance through an experiment or a user-settable value, and refers to the number of ping-pongs which makes the PS unstable and increases power consumption.

When the determined number of ping-pongs is less than the reference number of ping-pongs, the comparing module 223 identifies whether the first time set to the timer has lapsed. When the first time has lapsed, the comparing module 223 may repeatedly execute an operation of setting the timer to the first time, enabling operating the timer set to the first time, and determining whether the number of ping-pongs generated for the first time is equal to or greater than the reference number of ping-pongs. In contrast, when the first time has not lapsed, the comparing module 223 may perform an operation of determining whether the number of ping-pongs generated for the first time is equal to or greater than the reference number of ping-pongs.

When the determined number of ping-pongs is equal to or greater than the reference number of ping-pongs, the determining module 221 may determine an electric intensity of a signal received from the BS supporting the first RAT where the electronic device 101 is currently located and set the determined electric intensity as a reference electric intensity. The reference to electric intensity refers to a reference value to attempt the PS through the first RAT while the PS is provided through the second RAT. For example, when the electronic device 101 is located within the first cell area 105, the determining module 221 may receive a signal from the first BS 103 through the RF unit 209, determine an electric intensity of the received signal, and set the determined electric intensity as the reference electric intensity.

Then, the comparing module 223 is configured to activate the timer that has been set to the predetermined second time and operates the timer set to the second time. The second time is determined in advance, and refers to a time for which the PS is provided through the second RAT if a particular condition which prevents the generation of the ping-pong is not satisfied. The particular condition refers to a condition in which the PS is attempted through the first RAT even though the second time has not lapsed, and may include at least one of an electric intensity of a first communication network supporting the first RAT equal to or larger than a reference electric intensity, a change in a cell ID, and signal quality of the first communication network equal to or higher than reference signal quality. Note that the comparing module 223 is a programmable module which may be implemented by software that configures hardware, firmware that configures hardware, hardware, or a combination of two or more thereof, so the comparing module 223 can operate the timer.

Then, the providing module 225 may provide the PS through the second modem 215 supporting the second RAT. Further, the determining module 221 may be configured to determine an electric intensity of a signal received from the BS supporting the first RAT where the electronic device 101 is currently located. Note that the determining module is a programmable module which may be implemented by software that configures hardware, firmware that configures hardware, hardware, or a combination of two or more thereof, so the determining module can determine the electric intensity of the signal.

For example, when the electronic device 101 is located within a third cell area (not shown), the determining module 221 may receive a signal from a third BS (not shown) through the RF unit 209 and determine an electric intensity of the received signal.

Then, the comparing module 223 may compare the determined electric intensity with the reference electric intensity. When the determined electric intensity is smaller than the reference electric intensity, an output of the comparing module 223 may identify whether the second time set to the timer has lapsed. When the second time has not lapsed, the providing module 225 is configured to continuously provide the PS through the second modem 215 and repeatedly perform an operation of determining whether the electric intensity of the signal received from the BS supporting the first RAT where the electronic device 101 is currently located is equal to or larger than the reference electric intensity.

In contrast, when the determined electric intensity is equal to or larger than the reference electric intensity or the second time lapses, the providing module 225 releases the PS through the second modem 215 in order to provide the PS through the first RAT and attempts the PS through the first modem 213, and then the controller 201 may repeatedly perform the operation of setting the timer to the first time and operating the timer by using the determining module 221, the comparing module 223, and the providing module 225 and the next operation thereof.

In a second embodiment, the comparing module 223 sets the timer to the predetermined first time and operates the timer set to the first time. Then, the determining module 221 may determine the number of ping-pongs between the first RAT and the second RAT generated for the first time. While the PS is provided which is using the second modem 215 supporting the Second RAT, the service unit 219 tries the PS provision using the first modem 213 supporting the first RAT. If the above trial is failed, the service unit 219 tries the PS provision using the second modem 215. In that case, the determining module 221 may be configured to determine the number of the ping pongs as being one ping pong.

When the ping-pong is generated again for the first time, the determining module 221 may determine the number of ping-pongs as two.

The comparing module 223 may compare the determined number of ping-pongs with the predetermined reference number of ping-pongs. When the determined number of ping-pongs is less than the reference number of ping-pongs, the comparing module 223 may identify whether the first time set to the timer has lapsed. When the first time has lapsed, the comparing module 223 may repeatedly perform an operation of setting the timer to the first time, operating the timer set to the first time, and determining whether the number of ping-pongs generated for the first time is equal to or larger than the reference number of ping-pongs. In contrast, when the first time has not lapsed, the comparing module 223 may perform an operation of determining whether the number of ping-pongs generated for the first time is equal to or greater than the reference number of ping-pongs.

When the determined number of ping-pongs is equal to or greater than the reference number of ping-pongs, the determining module 221 may determine an electric intensity of a signal received from the BS supporting the first RAT where the electronic device 101 is currently located and set the determined electric intensity as a reference electric intensity. For example, when the electronic device 101 is located within the first cell area 105, the determining module 221 may receive a signal from the first BS 103 through the RF unit 209, determine an electric intensity of the received signal, and set the determined electric intensity as the reference electric intensity.

Further, the determining module 221 may receive BS-related information from the BS supporting the first RAT where the electronic device 101 is currently located. The determining module 221 may detect a first cell ID of the corresponding cell area by analyzing the received BS-related information. The determining module 221 may store the detected first cell ID in the memory unit 207. For example, when the electronic device 101 is located within the first cell area 105, the determining module 221 may receive BS-related information from the first BS 103, detect a first cell ID corresponding to the first cell area 105 by analyzing the received BS-related information, and store the detected first cell ID.

The comparing module 223 may set the timer to the predetermined second time. The comparing module 223 may operate the timer set to the predetermined second time. The providing module 225 may provide the PS through the second modem 215 supporting the second RAT. Then, the determining module 221 may determine the electric intensity of the signal received from the first communication network supporting the first RAT. For example, when the electronic device 101 is located within the third cell area, the determining module 221 may receive the signal from the third BS through the RF unit 209 and determine the electric intensity of the received signal.

Then, the comparing module 223 may compare the determined electric intensity with the reference electric intensity. When the determined electric intensity is less than the reference electric intensity, the determining module 221 may receive the BS-related information from the BS supporting the first RAT where the electronic device 101 is currently located. The determining module 221 may detect a second cell ID of the corresponding cell area by analyzing the received BS-related information. For example, when the electronic device 101 is located within the third cell area, the determining module 221 may receive the BS-related information from the third BS. The determining module 221 may detect a second cell ID corresponding to the third cell area by analyzing the received BS-related information.

Then, the comparing module 223 may compare the first cell ID with the second cell ID. When the first cell ID and the second cell ID are the same, the comparing module 223 may identify whether the second time set to the timer has lapsed. When the second time has not lapsed, the providing module 225 may continuously provide the PS through the second modem 215. The comparing module 223 may repeatedly perform the operation of identifying whether the electric intensity of the signal received from the BS supporting the first RAT where the electronic device 101 is currently located is equal to or greater than the reference electric intensity or identifying whether the cell ID is changed.

In contrast, when the determined electric intensity is equal to or greater than the reference electric intensity, the first cell ID and the second cell ID are different from each other, or the second time has lapsed, the providing module 225 may release the PS through the second modem 215 to provide the PS through the first RAT. And the providing module 225 may attempt the PS through the first modem 213. And then, the controller 201 is configured to repeatedly perform the operation of setting the timer to the first time and operating the timer by controlling the determining module 221, the comparing module 223, and the providing module 225 and the next operation thereof.

Figure 3:
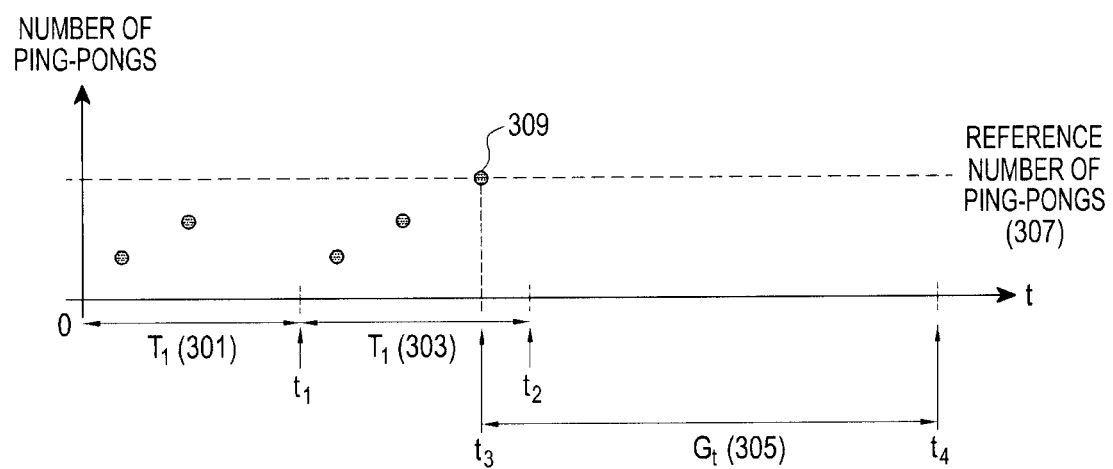
FIG. 3 is a graph showing a correlation between the number of ping-pongs and a protection interval according to an embodiment of the present disclosure.

FIG. 3 is a graph showing a correlation between the number of ping-pongs and a second interval (protection interval) according to an embodiment of the present disclosure.

Referring now to FIG. 3, in order to reduce the number of repeatedly generated ping-pongs, the controller 201 may compare the number of ping-pongs generated for a first time $T_1$ 301 with the reference number of ping-pongs. When the number of ping-pongs is two and the reference number of ping-pongs 307 is three, the controller 201 may reset the timer to the first time and operate the timer since the number of ping-pongs corresponding to two is less than the reference number of ping-pongs.

Further, the controller 201 compares the number of ping-pongs generated for the first time $T_1$ 303 with the reference number of ping-pongs. When the number of ping-pongs is three and the reference number of ping-pongs 307 is three, the controller 201 may reset the timer to the second time 305 and operate the timer since the number of ping-pongs corresponding to three is equal to or greater than the reference number of ping-pongs. When a particular condition is not satisfied for the second time 305, the controller 201 may provide the PS through the second modem 215 not to generate the ping-pong. The particular condition refers to a condition in which the PS is attempted through the first RAT even though the second time has not lapsed, and may include at least one of an electric intensity of a first communication network supporting the first RAT equal to or greater than a reference electric intensity, a change in a cell ID, and signal quality of the first communication network equal to or higher than reference signal quality.

For example, when the second time is longer than the first time, and the reference signal quality may be determined in advance or determined as the quality of the signal received from the BS supporting the first RAT when the number of ping-pongs corresponding to two is equal to or greater than the reference number of ping-pongs.

Figure 6:
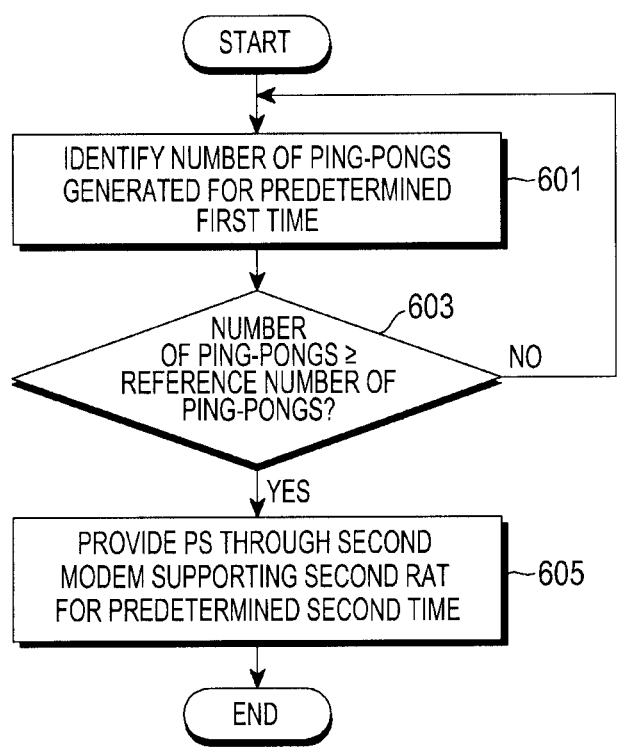
FIG. 6 is a flowchart illustrating a process of providing a PS according to a third embodiment of the present disclosure.

FIG. 6 is a flowchart illustrating an exemplary operational process of providing the PS according to the third embodiment of the present disclosure.

Referring now to FIG. 6, in operation 601, the determining module 221 determines the number of ping-pongs generated for a predetermined first time and then proceeds to operation 603. The first time is determined in advance, and refers to a time for which it is determined whether the number of ping-pongs between the first RAT and the second RAT is equal to or larger than a predetermined reference number of ping-pongs. The ping-pong between the first RAT and the second RAT refers to an operation including a trial of an access to the first RAT from the second RAT in order to provide the PS and then an access to the second RAT from the first RAT due to failure of the access to the first RAT.

In operation 603, the comparing module 223 compares the determined number of ping-pongs with the reference number of ping-pongs. The reference number of ping-pongs is determined in advance through an experiment, and refers to the number of ping-pongs which makes the PS unstable and increases power consumption. When the determined number of ping-pongs is less than the reference number of ping-pongs, the comparing module 223 repeatedly performs the operation corresponding to operation 601. When the determined number of ping-pongs is equal to or larger than the reference number of ping-pongs, the comparing module 223 may proceed to operation 605.

For example, at operation step 605, the providing module 225 may provide the PS through the second modem 215 that supports the second RAT for a predetermined second time. The amount of the second time is predetermined in advance, and refers to a time for which the PS is provided through the second RAT when a particular condition which prevents the generation of the ping-pong is not satisfied. The particular condition refers to a condition in which the PS is attempted through the first RAT even though the second time has not lapsed, and may include at least one of an electric intensity of a first communication network supporting the first RAT equal to or larger than a reference electric intensity, a change in a cell ID, and signal quality of the first communication network equal to or higher than reference signal quality.

Figure 4:
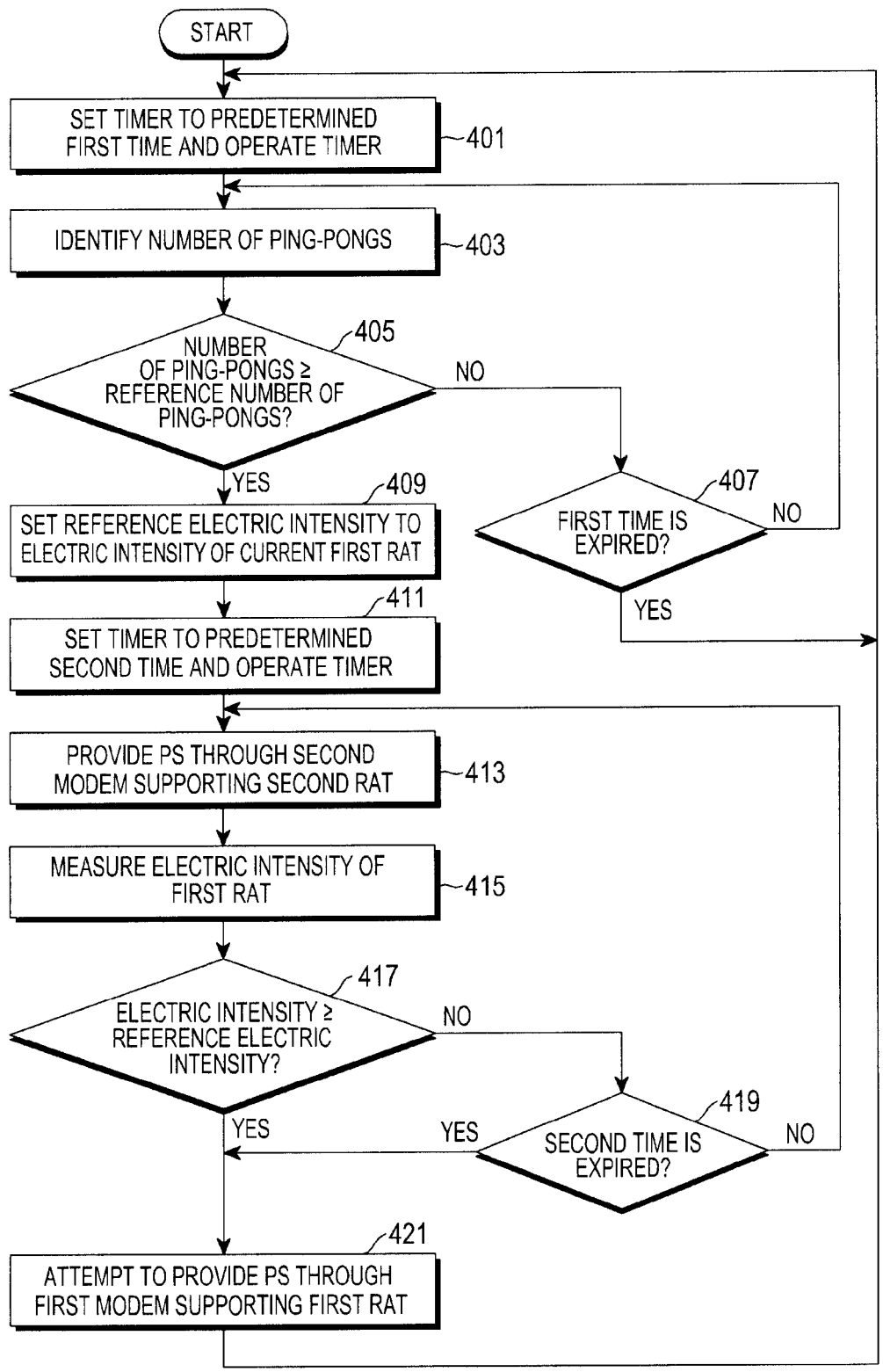
FIG. 4 is a flowchart illustrating operation of a process of providing a Packet Service (PS) according to a first embodiment of the present disclosure.

FIG. 4 is a flowchart illustrating an exemplary operational process of providing the PS according to the first embodiment of the present disclosure.

Referring now to FIG. 4, at operation 401, the comparing module 223 may set a timer (not shown) to a predetermined first time. The comparing module 223 may operate the timer set to the predetermined second time, and then proceeds to operation 403. The first time is determined in advance, and refers to a time for which it is determined whether the number of ping-pongs between the first RAT and the second RAT is equal to or greater than a predetermined reference number of ping-pongs. The ping-pong between the first RAT and the second RAT refers to an operation including a trial of an access to the first RAT from the second RAT in order to provide the PS and then an access to the second RAT from the first RAT due to failure of the access to the first RAT. For example, the ping-pong between the first RAT and the second RAT refers to an operation including a movement of the PS access route from the second modem 215 supporting the second RAT to the first modem 213 supporting the first RAT and another movement of the PS access route from the from the first modem 213 to the second modem 215 due to failure in the PS access through the first modem 213. For example, the first RAT may be LTE, and the second RAT may be GSM.

In operation 403, the determining module 221 may determine the number of ping-pongs between the first RAT and the second RAT generated for the first time and performs operation 405. The determining module 221 may determine the number of ping-pongs as being one in response to an occurrence of a trial operation of a PS access to the second modem 215 after the service unit 219 tries a PS access to the first modem 213 supporting the first RAT from the second modem 215 supporting the second RAT. If the ping-pong is generated again for the first time, the determining module 221 may determine the number of ping-pongs as being two.

At operation 405, the comparing module 223 may compare the determined number of ping-pongs with the predetermined reference number of ping-pongs. The reference number of ping-pongs is determined in advance through an experiment, and refers to the number of ping-pongs which makes the PS unstable and increases power consumption. When the determined number of ping-pongs is equal to or greater than the reference number of ping-pongs, the controller 201 performs operation 409. Otherwise, controller 201 performs operation 407. Note that the determining module is a programmable module which may be implemented by software that configures hardware, firmware that configures hardware, hardware, or a combination of two or more thereof, so the determining module can determine the intensity level. Furthermore, the controller 201 includes the determining module. Therefore, the controller 201 can be configured to perform a function of the determining module.

For example, at operation 407, the controller 201 may determine whether the first time set to the timer has lapsed based on an output received from the comparing module 223. When the first time has lapsed, the controller 201 performs operation 401. Otherwise, the controller performs operation 403.

For example, at operation 409, the determining module 221 may determine an electric intensity of a signal received from the BS supporting the first RAT where the electronic device 101 is currently located. Then, the determining module 221 sets the determined electric intensity as a reference electric intensity and then performs operation 411.

The reference electric intensity refers to a reference value to attempt the PS through the first RAT while the PS is provided through the second RAT. For example, when the electronic device 101 is located within the first cell area 105, the determining module 221 may receive a signal from the first BS 103, determine an electric intensity of the received signal, and set the determined electric intensity as the reference electric intensity.

At operation 411, the controller 201 sets the timer to a predetermined second time, operates the timer set to the second time, and then performs operation 413. The second time is determined in advance, and refers to a time for which the PS is provided through the second RAT if a particular condition which prevents the generation of the ping-pong is not satisfied. The particular condition refers to a condition in which the PS is attempted through the first RAT even though the second time has not lapsed, and may include at least one of an electric intensity of a first communication network supporting the first RAT equal to or greater than a reference electric intensity, a change in a cell ID, and signal quality of the first communication network equal to or higher than reference signal quality.

At operation 413, the providing module 225 may provide the PS through the second modem 215 supporting the second RAT. At operation 415, the determining module 221 may determine an electric intensity of a signal received from the BS supporting the first RAT where the electronic device 101 is currently located, and then performs operation 417. For example, when the electronic device 101 is located within a third cell area (not shown), the determining module 221 may receive a signal from a third BS (not shown) and determine an electric intensity of the received signal.

At operation 417, the comparing module 223 may compare the determined electric intensity with the reference electric intensity. When the determined electric intensity is equal to or greater than the reference electric intensity, the controller 201 in response to the comparing module 223 output performs operation 421. Otherwise, the controller 201 performs operation 419.

For example, at operation 419, the providing module 225 may determine whether the second time set to the timer has lapsed. When the second time has lapsed, the providing module 225 performs operation 421. Otherwise, the providing module 225 performs operation 413.

For example, the providing module 225 may release the PS through the second modem 215 to provide the PS through the first RAT and attempt the PS through the first modem 213 in operation 421, and then operation 401 to repeat the above operations.

Although it has been described in FIG. 4 that the providing module 225 provides the PS through the first modem 213 when the determined electric intensity is equal to or greater than the reference electric intensity, the present disclosure is not limited thereto. For example, when the quality of the signal received from the BS supporting the first RAT is equal to or greater than the reference electric intensity or a cell ID corresponding to the cell area of the BS supporting the first RAT is changed, the providing module 225 may provide the PS through the first modem 213.

Figure 5A:
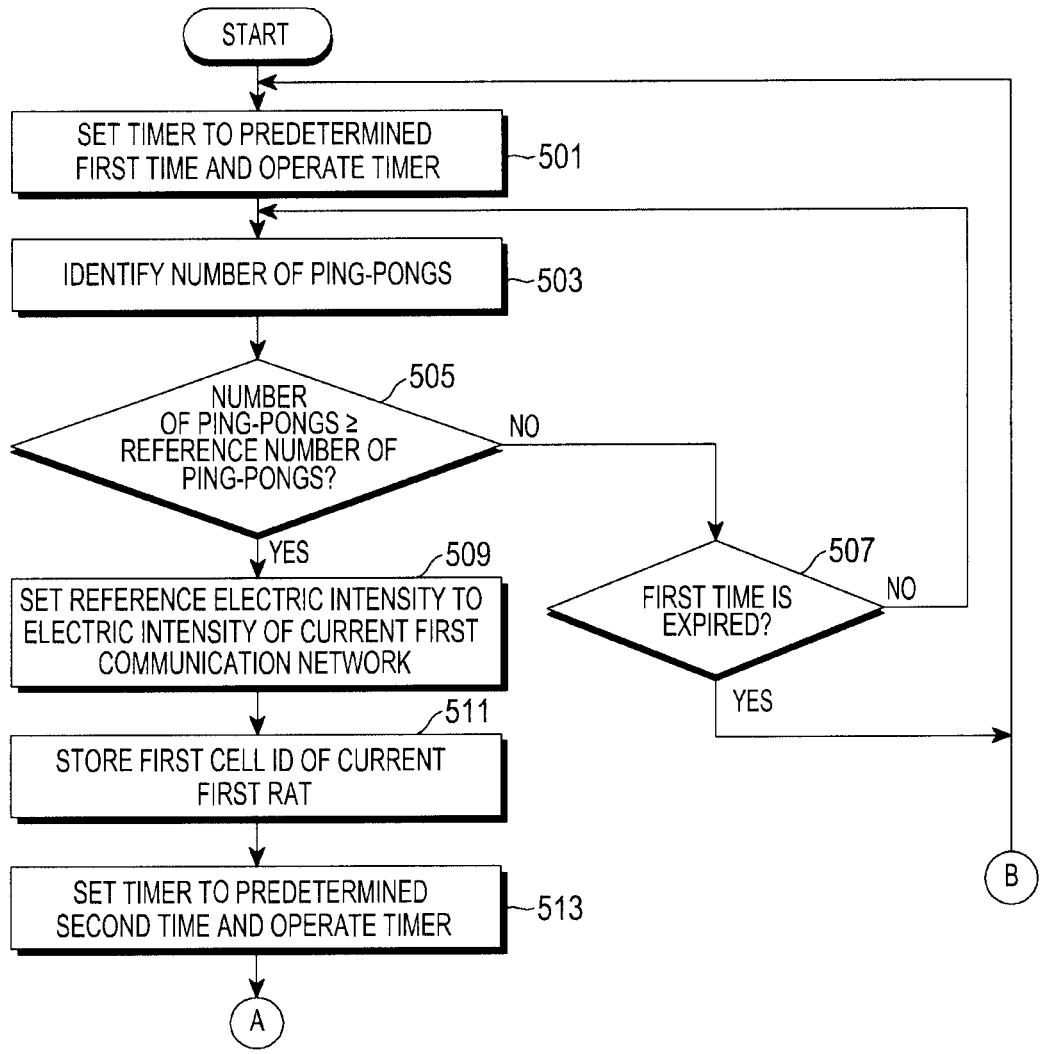
FIG. 5A and FIG. 5B are flowcharts illustrating a process of providing a PS according to a second embodiment of the present disclosure.
Figure 5B:
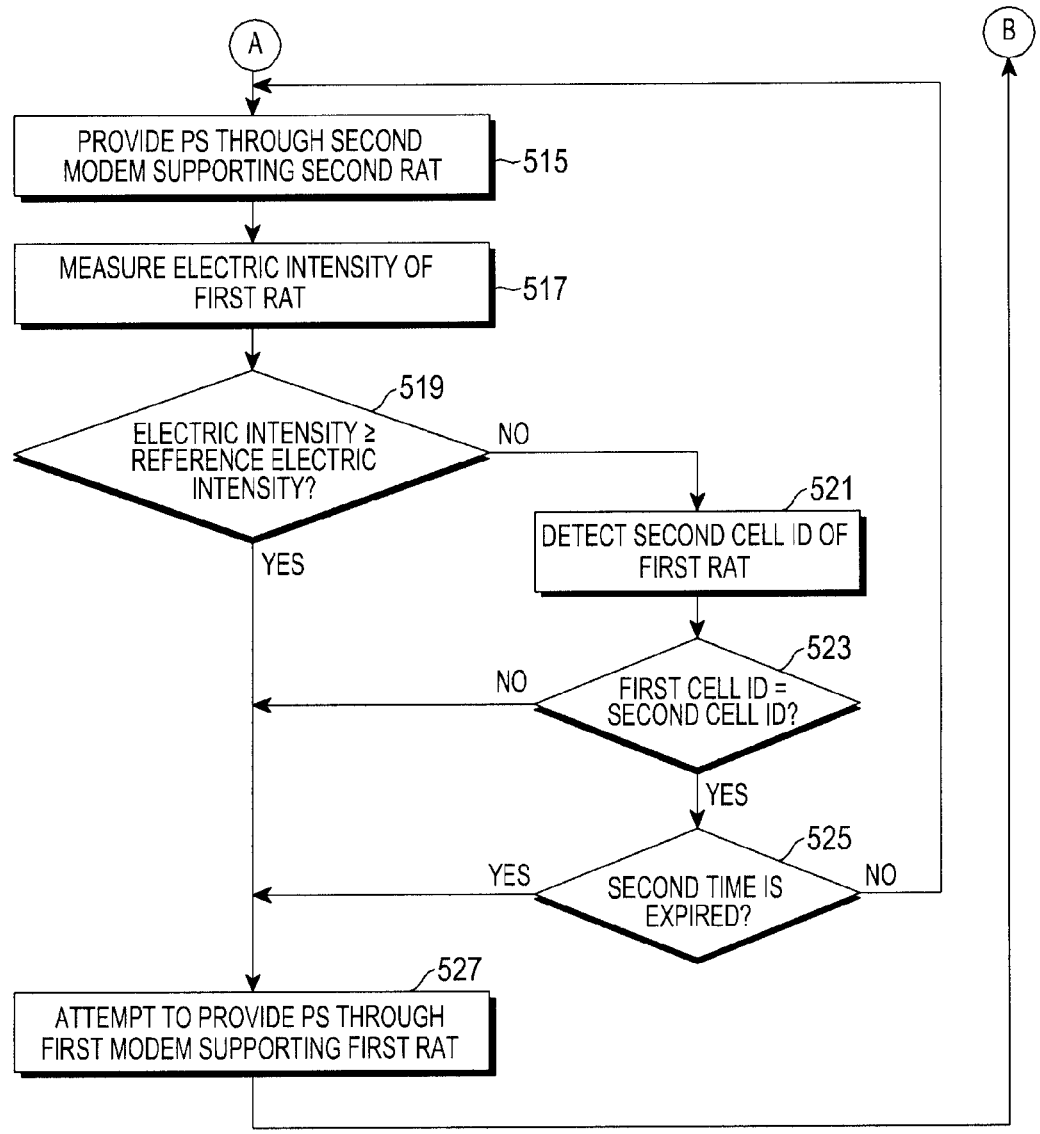

FIGS. 5A and 5B are flowcharts illustrating a process of providing the PS according to the second embodiment of the present disclosure.

Referring to FIGS. 5A and 5B, at operation 501, the comparing module 223 may set a timer (not shown) to a predetermined first time, operate the timer set to at the first predetermined first time, and then perform operation 503. The first time is determined in advance, and refers to a time for which it is determined whether the number of ping-pongs between the first RAT and the second RAT is equal to or greater than a predetermined reference number of ping-pongs. The ping-pong between the first RAT and the second RAT refers to an operation including a trial of an access to the first RAT from the second RAT in order to provide the PS and then an access to the second RAT from the first RAT due to failure of the access to the first RAT. For example, the ping-pong between the first RAT and the second RAT refers to an operation including a movement of the PS access route from the second modem 215 supporting the second RAT to the first modem 213 supporting the first RAT and another movement of the PS access route from the from the first modem 213 to the second modem 215 due to failure in the PS access through the first modem 213. For example, the first RAT may be LTE, and the second RAT may be GSM.

At operation 503, the determining module 221 may determine the number of ping-pongs between the first RAT and the second RAT generated for the first time and performs operation 505. For example, the determining module 221 may determine the number of ping-pongs as being one in response to an occurrence of a trial operation of a PS access to the second modem 215 while the determining module 221 tries a PS access to the first modem 213 supporting the first RAT from the second modem 215 supporting the second RAT. If the ping-pong is generated again for the first time, the determining module 221 may determine the number of ping-pongs as being two.

At operation 505, the comparing module 223 may compare the determined number of ping-pongs with the predetermined reference number of ping-pongs. The reference number of ping-pongs is determined in advance through an experiment, and refers to the number of ping-pongs which makes the PS unstable and increases power consumption. When the determined number of ping-pongs is equal to or greater than the reference number of ping-pongs, the controller 201 performs operation 509. Otherwise, the controller performs operation 507.

For example, at operation 507, the controller 201 may determine whether the first time set to the timer has lapsed. When the first time has lapsed, the controller 201 performs operation 501. Otherwise, the controller performs operation 503.

For example, the determining module 221 may determine an electric intensity of a signal received from the BS supporting the first RAT where the electronic device 101 is currently located and set the determined electric intensity as a reference electric intensity at operation 509, and then performs operation 511. The reference electric intensity refers to a reference value to attempt the PS through the first RAT while the PS is provided through the second RAT. For example, when the electronic device 101 is located within the first cell area 105, the determining module 221 may receive a signal from the first BS 103 through the RF unit 209, determine an electric intensity of the received signal, and set the determined electric intensity as the reference electric intensity.

At operation 511, the determining module 221 may receive BS-related information from the BS supporting the first RAT where the electronic device 101 is currently located. Further, the determining module 221 may detect a first cell ID of the corresponding cell area by analyzing the received BS-related information, store the detected first cell ID in the memory unit 207, and then performs operation 513. For example, when the electronic device 101 is located within the first cell area 105, the determining module 221 may receive BS-related information from the first BS 103, detect a first cell ID corresponding to the first cell area 105 by analyzing the received BS-related information, and store the detected first cell ID.

At operation 513, the controller 201 may set the timer to a predetermined second time. Further, the controller 201 may operate the timer set to the predetermined second time, and then perform operation 515. The second time is determined in advance, and refers to a time for which the PS is provided through the second RAT if a particular condition which prevents the generation of the ping-pong is not satisfied. The particular condition refers to a condition in which the PS is attempted through the first RAT even though the second time has not lapsed, and may include at least one of an electric intensity of a first communication network supporting the first RAT equal to or greater than a reference electric intensity, a change in a cell ID, and signal quality of the first communication network equal to or higher than reference signal quality.

At operation 515, the providing module 225 may provide the PS through the second modem 215 supporting the second RAT. The determining module 221 may determine an electric intensity of the signal received from the first communication network supporting the first RAT at operation 517 and then perform operation 519. For example, when the electronic device 101 is located within a third cell area (not shown), the determining module 221 may receive a signal from a third BS (not shown) and determine an electric intensity of the received signal.

At operation 519, the comparing module 223 may compare the determined electric intensity with the reference electric intensity. When the determined electric intensity is equal to or greater than the reference electric intensity, the controller 201 performs operation 527. Otherwise, the controller 201 performs operation 521.

For example, the determining module 221 may receive BS-related information from the BS supporting the first RAT where the electronic device 101 is currently located at operation 521. Further, the determining module 221 may detect a second cell ID of the corresponding cell area by analyzing the received BS-related information. For example, when the electronic device 101 is located within a third cell area (not shown), the determining module 221 may receive BS-related information from a third BS (not shown) and detect a second cell ID corresponding to the third cell area by analyzing the received BS-related information.

At operation 523, the comparing module 223 may compare the first cell ID with the second cell ID. When the first cell ID and the second cell ID are the same, the controller 201 performs 525. Otherwise, the controller 201 performs operation 527.

For example, at operation 525, the comparing module 223 may determine whether the second time set to the timer has lapsed. When the second time has lapsed, the providing module 225 performs operation 527. Otherwise, the providing module 225 performs operation 525.

For example, the providing module 225 may release the PS through the second modem 215 in order to provide the PS through the first RAT and attempt the PS through the first modem 213 at operation 527, and then performs operation 501 to repeat the above steps.

Although it has been described in FIGS. 5A and 5B that the providing module 225 provides the PS through the first modem 213 when the determined electric intensity is equal to or greater than the reference electric intensity or the cell ID corresponding to the cell area of the BS supporting the first RAT is changed, the present disclosure is not limited thereto. For example, the providing module 225 may provide the PS through the first modem 213 when the quality of the signal received from the BS supporting the first RAT is equal to or greater than the reference electric intensity.

Various embodiments of the present disclosure may provide an apparatus and a method for providing the PS in the electronic device through such an operation, so as to reduce the number of ping-pongs and thus provide a stable PS. Various embodiments of the present disclosure may provide an apparatus and a method for providing the PS in the electronic device, so as to reduce the number of ping-pongs and thus reduce power consumption due to the ping-pong.

According to various embodiments of the present disclosure, an apparatus and a method for providing the PS in the electronic device can be implemented as a code readable by a computer in a computer-readable recording medium. The computer-readable recording medium includes all types of recording devices in which data readable by a computer system are stored. As such a recording medium, for example, a Read Only Memory (ROM), a Random Access Memory (RAM), an optical disc, a magnetic tape, a floppy disc, a hard disc, or a non-volatile memory may be used, and a medium implemented in a type of carrier wave (for example, transmission through the Internet) may also be included in such a recording medium. In addition, the computer-readable recording medium may be stored with codes which are distributed in computer systems connected by a network such that the codes can be read and executed by a computer in a distributed method.

According to various embodiments of the present disclosure, each of programming modules may be implemented by software that configures hardware, firmware that configures hardware, hardware, or a combination of two or more thereof. The names of the components of the hardware according to various embodiments of the present disclosure may vary depending on the type of electronic device. The hardware according to various embodiments of the present disclosure may include at least one of the components, or some of the components may be omitted or additional other components may be further included. Further, one entity configured by combining some of the components of the hardware according to the present disclosure can perform the same functions as the corresponding components before the combination.

The controller 201 comprises hardware having circuitry that includes one or more Application Processors (hereinafter referred to as "APs") or one or more Communication Processors (hereinafter referred to as "CPs"). For example, when the controller 201 includes the AP and the CP, the AP and the CP may be included in one IC package or included in different IC packages, respectively. The AP may control a plurality of hardware or software components connected to the AP by driving an operating system or an application program to and perform processing of various data including multimedia data and calculation. For example, the AP may be implemented by a SoC (System on Chip). According to an embodiment, the controller 201 may further include a Graphic Processing Unit (GPU).

The above-described embodiments of the present disclosure can be implemented in hardware, firmware or via the execution by hardware of software or computer code that is configured into hardware circuitry including integrated circuits such as microprocessors and such as that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software that configures operation of hardware or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "controller", "processor" or "microprocessor" constitutes hardware in the claimed invention. Under the broadest reasonable interpretation, the appended claims constitute statutory subject matter in compliance with 35 U.S.C. §101 and none of the elements constitute of software per se.

The terms "unit" or "module" as may be used herein is to be understood as constituting or operating in conjunction with hardware such as a circuit, integrated circuit, processor or microprocessor configured for a certain desired functionality in accordance with statutory subject matter under 35 U.S.C. §101, and such terms do not constitute software per se.

While the present disclosure has been described with reference to detailed embodiments including a mobile communication user device, various modifications can be made without departing from the scope of the present disclosure. It is apparent that the scope of the present disclosure should not be defined by the above described embodiments, but should be defined by the claims and the equivalents thereof.

What is claimed is:

1. An electronic device comprising:
   a first modem that supports a first Radio Access Technology (RAT);
   a second modem that supports a second RAT;
   memory storing a plurality of executable instructions; and
   at least one processor coupled to the memory, said at least one processor configure to:
   determine a number of ping-pongs in which an access change between the first modem and the second modem of the electronic device is repeatedly made for a predetermined first time;
   compare the number of ping-pongs with a predetermined reference number of ping-pongs;
   provide a Packet Service (PS) through the second modem for a predetermined second time when the number of ping-pongs is equal to or greater than the predetermined reference number of ping-pongs; and
   change an access for providing the PS to the first modem from the second moderm based on an electric intensity of a signal received through a communication network suprroting the first RAT, when the second time has lapsed.

2. The electronic device of claim 1, wherein the one or more processors is configured to set a reference electric intensity as the electric intensity of a signal received by the electronic device from a first Base Station (BS) supporting the first RAT, when the number of ping-pongs is equal to or greater than the predetermined reference number of ping-pongs.

3. The electronic device of claim 2, wherein the one or more processors is configured to provide the PS through the first modem when an electric intensity of a signal received from a second BS supporting the first RAT for the second time is equal to or greater than the reference electric intensity.

4. The electronic device of claim 2, wherein the one or more processors is configured to continuously provide the PS through the second modem when an electric intensity a signal received from a second BS supporting the first RAT for the second time is less than the reference electric intensity.

5. The electronic device of claim 1, wherein the one or more processors is configured to provide the PS through the first modem when a quality of a signal received from a second BS supporting the first RAT for the second time is equal to or higher than a predetermined reference quality.

6. The electronic device of claim 1, wherein the one or more processors is configured to store a first cell IDentification (ID) corresponding to a first cell area of a third BS supporting the first RAT when the number of ping-pongs is equal to or greater than the predetermined reference number of ping-pongs.

7. The electronic device of claim 6, wherein the one or more processors is configured to provide the PS through the first modem when a second cell ID corresponding to a second cell area of a fourth BS supporting the first RAT for the second time is different from the first cell ID.

8. The electronic device of claim 6, wherein the one or more processors is configured to continuously provide the PS through the second modem when a second cell ID corresponding to a second cell area of a fourth BS supporting the first RAT for the second time is equal to the first cell ID.

9. The electronic device of claim 1, wherein the one or more processors is configured to provide the PS through the first modem when the second time has lapsed.

10. The electronic device of claim 1, wherein the first RAT includes Long Term Evolution (LTE), and the second RAT includes Global System for Mobile telecommunication (GSM).

11. A method of providing a Packet Service (PS) in an electronic device, the method comprising:
determining by a determining module a number of ping-pongs in which an access change between a first modem supporting a first RAT and a second modem supporting a second RAT is repeatedly made for a predetermined first time;
comparing the number of ping-pongs determined by the determining module with a predetermined reference number of ping-pongs;
providing the PS through the second modem for a predetermined second time when the determined number of ping-pongs determined by the determining module is equal to or greater than the reference number of ping-pongs; and
changing an access for providing the PS to the first modem from the second modem based on an electric intensity of a signal received through a communication network supproting the first RAT, when the second time has lapsed.

12. The method of claim 11, further comprising determining the electric intensity of a signal received by the electronic device from a first BS supporting the first RAT as a reference electric intensity when the determined number of ping-pongs determined by the determining module is equal to or greater than the reference number of ping-pongs.

13. The method of claim 12, further comprising providing the PS through the first modem when an electric intensity of a signal received from a second BS supporting the first RAT for the second time is equal to or greater than the reference electric intensity.

14. The method of claim 12, further comprising continuously providing the PS through the second modem when an electric intensity of a signal received from a second BS supporting the first RAT for the second time is less than the reference electric intensity.

15. The method of claim 11, further comprising providing the PS through the first modem when a quality of a signal received from a second BS supporting the first RAT for the second time is equal to or higher than a predetermined reference quality.

16. The method of claim 11, further comprising storing a first cell ID corresponding to a first cell area of a third BS supporting the first RAT when the determined number of ping-pongs determined by the determining module is equal to or greater than the predetermined reference number of ping-pongs.

17. The method of claim 16, further comprising providing the PS through the first modem when a second cell ID corresponding to a second cell area of a fourth BS supporting the first RAT for the second time is different from the first cell ID.

18. The method of claim 16, further comprising continuously providing the PS through the second modem when a second cell ID corresponding to a second cell area of a fourth BS supporting the first RAT for the second time is equal to the first cell ID.

19. The method of claim 11, further comprising providing the PS through the first modem when the second time has lapsed.

20. A non-transitory storage medium storing machine executable code comprising commands set to allow one or more processors to perform one or more operations when the commands are executed by the one or more processors, the one or more operations comprising:
determining a number of ping-pongs in which an access change between a first modem supporting a first RAT and a second modem supporting a second RAT is repeatedly made for a predetermined first time;
comparing the number of ping-pongs in which the access change occurs with a predetermined reference number of ping-pongs;
providing the PS through the second modem for a predetermined second time when the number of ping-pongs in which the access change occurs is equal to or greater than the reference number of ping-pongs; and
changing an access for providing the PS to the first modem from the second modem based on an electric intensity of a signal received through a communication network supporting the first RAT, when the second time has lapsed.

* * * * *